US 10,921,111 B2

United States Patent
Chen et al.

(10) Patent No.: US 10,921,111 B2
(45) Date of Patent: Feb. 16, 2021

(54) DETECTING DEVICE, DETECTING METHOD, LIQUID CRYSTAL DROPPING APPARATUS, AND LIQUID CRYSTAL DROPPING METHOD

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Jian Chen, Beijing (CN); Sangman Yuk, Beijing (CN); Huifang Yuan, Beijing (CN); Wenhao Tang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 50 days.

(21) Appl. No.: 16/335,043

(22) PCT Filed: May 16, 2018

(86) PCT No.: PCT/CN2018/087107
§ 371 (c)(1),
(2) Date: Mar. 20, 2019

(87) PCT Pub. No.: WO2018/219145
PCT Pub. Date: Dec. 6, 2018

(65) Prior Publication Data
US 2019/0277620 A1    Sep. 12, 2019

(30) Foreign Application Priority Data

May 31, 2017 (CN) .......................... 2017 1 0398518

(51) Int. Cl.
*G01B 9/02* (2006.01)
*G06T 7/62* (2017.01)
(Continued)

(52) U.S. Cl.
CPC .......... *G01B 9/0203* (2013.01); *G01B 11/022* (2013.01); *G01B 11/0675* (2013.01);
(Continued)

(58) Field of Classification Search
CPC .............. G01B 11/022; G01B 11/0675; G01B 9/0203; G01B 11/00; G01B 9/0209;
(Continued)

(56) References Cited

U.S. PATENT DOCUMENTS

2008/0180686 A1* 7/2008 Sakai .................. G02B 5/201
356/511
2013/0229589 A1* 9/2013 Won ...................... G02F 1/1309
349/43

FOREIGN PATENT DOCUMENTS

CN    101231159 A    7/2008
CN    105247318 A    1/2016
(Continued)

OTHER PUBLICATIONS

First Office Action dated May 27, 2019 corresponding to Chinese application No. 201710398518.9.
(Continued)

*Primary Examiner* — Tri T Ton
(74) *Attorney, Agent, or Firm* — Nath, Goldberg & Meyer; Joshua B. Goldberg

(57) ABSTRACT

Detecting device and method, and liquid crystal dropping apparatus and method are provided. The detecting device is configured to detect a volume of an uneven region of a color filter substrate in a display area, and includes at least one collection unit and a processing circuit. The collection unit
(Continued)

is configured to obtain a surface image of the color filter substrate in the display area, and output the obtained surface image to the processing circuit. The processing circuit is connected to the collection unit and configured to process the surface image to obtain a volume of the uneven region of the color filter substrate in the display area. The detecting device and the corresponding method can automatically obtain the volume of the uneven region of the color filter substrate in the display area, thereby obtaining an appropriate filling amount of liquid crystal and ensuring product quality.

18 Claims, 5 Drawing Sheets

(51) Int. Cl.
*G06T 7/521* (2017.01)
*G01B 11/02* (2006.01)
*G01B 11/06* (2006.01)
*G02F 1/13* (2006.01)
*G02F 1/1341* (2006.01)
*H04N 5/372* (2011.01)

(52) U.S. Cl.
CPC .......... *G02F 1/1309* (2013.01); *G02F 1/1341* (2013.01); *G06T 7/521* (2017.01); *G06T 7/62* (2017.01); *G02F 2001/13415* (2013.01); *H04N 5/372* (2013.01)

(58) Field of Classification Search
CPC ................. G02F 1/1309; G02F 1/1341; G02F 2001/13415; G06T 7/521; G06T 7/62; G06T 2207/10024; G06T 2207/10056; G06T 2207/30121; H04N 5/372
USPC .................................................. 356/600–613
See application file for complete search history.

(56) References Cited

FOREIGN PATENT DOCUMENTS

| | | |
|---|---|---|
| CN | 105988297 A | 10/2016 |
| CN | 107367850 A | 11/2017 |
| JP | 2014190733 A | 10/2014 |

OTHER PUBLICATIONS

International Search Report dated Aug. 23, 2018 corresponding to application No. PCT/CN2018/087107.

\* cited by examiner

DETECTING DEVICE, DETECTING METHOD, LIQUID CRYSTAL DROPPING APPARATUS, AND LIQUID CRYSTAL DROPPING METHOD

This is a National Phase Application filed under 35 U.S.C. 371 as a national stage of PCT/CN2018/087107, filed on May 16, 2018, an application claiming the benefit of Chinese Application No. 201710398518.9, filed on May 31, 2017, the content of which is hereby incorporated by reference in its entirety.

TECHNICAL FIELD

The present disclosure relates to the field of display technology, more particularly, to a detecting device, a detecting method, a liquid crystal dropping apparatus, and a liquid crystal dropping method.

BACKGROUND

With the development of science and technology, liquid crystal display (LCD) devices have become the mainstream product among current display devices. A liquid crystal display device mainly includes a color filter substrate and an array substrate disposed opposite to each other, and a liquid crystal disposed therebetween. The array substrate includes a plurality of thin film transistors (TFTs) and electrodes connected to the thin film transistors for controlling state of the liquid crystal, so as to control outgoing light from a backlight. The color filter substrate includes a plurality of color film layers (including red film layers, green film layers, and blue film layers, collectively referred to as RGB film layers) configured to colorize outgoing light to finally realize color display.

SUMMARY

The present disclosure provides a detecting device, a detecting method, a liquid crystal dropping apparatus, and a liquid crystal dropping method for automatically detecting a volume of an uneven region of a color filter substrate in a display area, thereby obtaining an appropriate filling amount of liquid crystal and ensuring display quality.

In one aspect, the present disclosure provides a detecting device, configured to detect a volume of an uneven region of a color filter substrate in a display area, and including a collection unit and a processing circuit, wherein:

the collection unit is configured to obtain a surface image of the color filter substrate in the display area, and output the obtained surface image to the processing circuit; and the processing circuit is connected to the collection unit and configured to process the surface image to obtain the volume of the uneven region of the color filter substrate in the display area.

In an embodiment, the processing circuit includes a separation circuit, a calculation circuit, and a summary circuit, wherein:

the separation circuit is configured to obtain, from the surface image, size parameters of color film layers in a plurality of pixel regions;

the calculation circuit is connected to the separation circuit and configured to receive the size parameters of the color film layers in the plurality of pixel regions obtained by the separation circuit, and calculate step differences between the color film layers of different colors; and the summary circuit is connected to the calculation circuit and configured to calculate the volume of the uneven region of the color filter substrate in the display area based on the step differences between the color film layers of different colors.

In an embodiment, in the calculation circuit, by taking, as a reference, a thickness of the color film layers of one color among the color film layers of different colors, the step difference of the color film layers of each of the other colors with respect to the color film layers of the one color is calculated.

In an embodiment, the collection unit includes a light source unit, an optical path unit and an acquisition unit, wherein:

the light source unit is configured to provide a measurement beam to the optical path unit;

the optical path unit is configured to receive the measurement beam and convert the measurement beam into a reference beam and an illumination beam such that the reference beam interferes with a reflected beam of the illumination beam irradiating on a surface of the color filter substrate to generate an interference image; and the acquisition unit is configured to receive the interference image generated by the optical path unit, and obtain the surface image of the color filter substrate in the display area based on the interference image.

In an embodiment, the optical path unit includes a beam expander, a transflective mirror, an imaging lens, and an interference optical assembly, optical axes of the beam expander and the imaging lens are perpendicular to each other, the imaging lens and the interference optical assembly are on two sides of the transflective mirror, respectively, wherein:

the beam expander is between the light source unit and the transflective mirror and configured to collimate and expand light emitted from the light source unit to generate a parallel beam and cause the generated parallel beam to be emitted toward the transflective mirror;

the transflective mirror is configured to receive the parallel beam from the beam expander and reflect the parallel beam to the interference optical assembly;

the interference optical assembly is configured to receive the reflected parallel beam from the transflective mirror and split the reflected parallel beam into the reference beam and the illumination beam, the illumination beam irradiates onto the surface of the color filter substrate to generate the reflected beam, and the reflected beam interferes with the reference beam to produce the interference image including surface information of the color filter substrate; and the imaging lens is between the acquisition unit and the transflective mirror and configured to image the interference image to the acquisition unit.

In an embodiment, the interference optical assembly includes an objective lens, a beam splitter, and a reference mirror parallel to one another, wherein:

the objective lens is configured to receive the reflected parallel beam from the transflective mirror and transmit the same to the beam splitter;

the beam splitter is configured to transmit a part of the beam from the objective lens to the surface of the color filter substrate to generate the reflected beam on the surface of the color filter substrate, and reflect a part of the beam from the objective lens to the reference mirror; and the reference mirror is between the objective lens and the beam splitter, and a distance between the beam splitter and the reference mirror is adjustable, the reference mirror is configured to reflect all received beam to the beam splitter to generate the reference beam, wherein the reference beam is capable of interfering with the reflected beam generated on the surface of the color filter substrate to generate an imaging parallel beam through the objective lens.

In an embodiment, the light source unit is a white light source configured to provide white light, as the measurement beam, to the optical path unit.

In an embodiment, the detecting device includes a plurality of collection units, and the plurality of collection units are each connected to the processing circuit.

In an embodiment, the optical path units of the plurality of collection units share one light source unit.

In an embodiment, the detecting device further includes a gantry configured to support the collection unit, the collection unit being disposed on the gantry.

In an embodiment, the detecting device further includes a gantry configured to support the collection units, the collection units being disposed on the gantry.

In an embodiment, the acquisition unit is a CCD camera.

In another aspect, the present disclosure provides a detecting method for detecting a volume of an uneven region of a color filter substrate in a display area, including steps of:

obtaining and outputting a surface image of the color filter substrate in the display area; and processing the surface image to obtain the volume of the uneven region of the color filter substrate in the display area.

In an embodiment, the step of obtaining and outputting a surface image of the color filter substrate in the display area includes:

providing a measurement beam;

splitting the measurement beam into a reference beam and an illuminating beam such that the reference beam interferes with a reflected beam generated by the illuminating beam irradiating on a surface of the color filter substrate to produce an interference image; and obtaining the surface image of the color filter substrate in the display area based on the interference image.

In an embodiment, the step of processing the surface image to obtain the volume of the uneven region of the color filter substrate in the display area includes:

obtaining, from the surface image, size parameters of color film layers in a plurality of pixel regions;

receiving the size parameters of the color film layers in the plurality of pixel regions, and calculating step differences between the color layers of different colors; and calculating the volume of the uneven region of the color filter substrate in the display area based on the step differences between the color film layers of different colors.

In an embodiment, the above detecting method may be implemented by using the above detecting device, and the method includes:

obtaining the surface image of the color filter substrate in the display area and outputting the obtained surface image to the processing circuit by the collection unit; and processing, by the processing circuit, the surface image to obtain the volume of the uneven region of the color filter substrate in the display area.

In an embodiment, the step of obtaining the surface image of the color filter substrate in the display area and outputting the obtained surface image to the processing circuit by the collection unit includes:

providing, by the light source unit, a measurement beam;

splitting, by the optical path unit, the measurement beam into a reference beam and an illuminating beam such that reference beam interferes with the reflected beam generated by the illuminating beam irradiating on the surface of the color filter substrate to produce the interference image; and obtaining, by the acquisition unit, the surface image of the color filter substrate in the display area based on the interference image.

In an embodiment, the step of obtaining the surface image of the color filter substrate in the display area and outputting the obtained surface image to the processing circuit by the collection unit includes:

collimating and expanding, by the beam expander, the measurement beam to generate a parallel beam;

reflecting, by the transflective mirror, the parallel beam to generate a reflected parallel beam;

splitting, by the interference optical assembly, the reflected parallel beam into the reference beam and the illumination beam, wherein the illumination beam irradiates on the surface of the color filter substrate to generate the reflected beam, the reflected beam interferes with the reference beam to generate the interference image including surface information of the color filter substrate; and obtaining, by the acquisition unit, the surface image of the color filter substrate in the display area based on the interference image.

In an embodiment, the step of processing, by the processing circuit, the surface image to obtain the volume of the uneven region of the color filter substrate in the display area includes:

obtaining the size parameters of the color film layers in the plurality of pixel regions from the surface image and sending the obtained size parameters of the color film layers to the calculation circuit by the separation circuit;

receiving the size parameters of the color film layers of the plurality of pixel regions and calculating the step differences between the color film layers of different colors by the calculation circuit; and calculating the volume of the uneven region of the color filter substrate in the display area based on the step differences between the color film layers of different colors by the summary circuit.

In an embodiment, when calculating the step differences between the color film layers of different colors, by taking, as a reference, a thickness of the color film layers of one color among the color film layers of different colors, the step difference of the color film layers of each of the other colors with respect to the color film layers of the one color is calculated.

In another aspect, the present disclosure provides a liquid crystal dropping apparatus including a liquid crystal dropping device and the above detecting device, wherein the liquid crystal dropping device fills with a liquid crystal according to the volume of the uneven region of the color filter substrate in the display area obtained by the detecting device.

In still another aspect, the present disclosure provides a liquid crystal dropping method, including the above-described detecting method, wherein the liquid crystal dropping method further includes filling with a liquid crystal according to the volume of the uneven region of the color filter substrate in the display area obtained by the detecting method.

DETAILED DESCRIPTION

In order to enable those skilled in the art to better understand the technical solutions of the present disclosure, a detecting device, a detecting method, a liquid crystal dropping apparatus and a liquid crystal dropping method of the present disclosure are further described in detail below with reference to the accompanying drawings and specific implementations.

Figure 1:
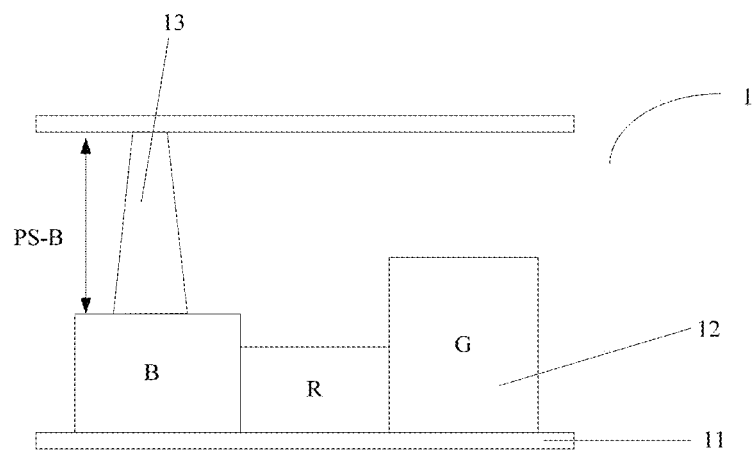
FIG. 1 is a schematic structural diagram of a color filter substrate.

The manufacturing process of a liquid crystal display device includes production of an array substrate (TFT process) and a color filter substrate (CF process) in the early stage, cell-forming of a liquid crystal panel (CELL) in the middle stage, and module assembly in the late stage, and the cell-forming stage mainly includes aligning and assembling the array substrate with the color filter substrate, and filling with a liquid crystal therebetween. The inventors of the present application have noticed that the filling amount of liquid crystal has a decisive effect on the display quality of a display device. However, process fluctuations due to equipment differences, equipment fluctuations, batch differences in raw materials, and personnel operability differences in the process of manufacturing color filter substrates are inevitable. Therefore, there is a certain step between the RGB film layers on the color filter substrate (as shown in FIG. 1), and although an overcoat (OC) layer is provided for planarization, the manufactured color filter substrate still has an uneven surface. In the cell-forming stage, it is necessary to calculate the amount of liquid crystal required for filling. To calculate the amount of liquid crystal required at the uneven surface of the color filter substrate, a method that is mainly used at present includes manually measuring step differences between RGB film layers at several points and then averaging the measured step differences between RGB film layers to calculate the volume at the uneven surface of the entire substrate. Since the several points are selected manually and randomly, the accuracy is inevitably not sufficient. In a case of relatively large deviation, the liquid crystal margin (LC Margin) may be shifted, which is very likely to cause poor quality in combination with fluctuations in the TFT process and the process of the CELL stage.

For this reason, the present disclosure, inter alia, provides a detecting device, a detecting method, a liquid crystal dropping apparatus, and a liquid crystal dropping method.

In view of the problem that it is difficult to accurately calculate the filling amount of liquid crystal due to the uneven surface of the color filter substrate to thus cause a problem in the quality of a display device due to inappropriate filling amount of the liquid crystal, the present disclosure provides a detecting device. By detecting a volume of an uneven region of the color filter substrate in the display area, the detecting device can automatically detect an appropriate filling amount of liquid crystal, so as to ensure the quality of the display device.

Figure 2:
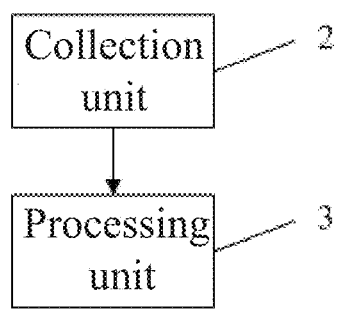
FIG. 2 is a schematic block diagram of a detecting device in an embodiment of the present disclosure.

The detecting device provided in the embodiment is a novel microscopic detecting device used after coating an alignment layer PI in the cell-forming process of a liquid crystal panel, and is configured to detect a surface state of a color filter substrate on which color film layers of multiple colors have been formed, and further obtain the volume of an uneven region of the color filter substrate in the display area. As shown in FIG. 2, the detecting device includes a collection unit 2 and a processing circuit 3. The collection unit 2 is configured to obtain a surface image of the color filter substrate in the display area and output the obtained surface image to the processing circuit. The processing circuit 3 is connected to the collection unit 2 and configured to process the surface image to obtain a volume of an uneven region of the color filter substrate in the display area. The processing circuit 3 in an embodiment of the present disclosure may include a separation circuit, a calculation circuit, and a summary circuit.

The separation circuit is configured to obtain, from the surface image, size parameters of color film layers of the plurality of pixel regions in the display area and send the obtained size parameters of the color film layers to a calculation circuit, and the size parameter of a color film layer includes at least the thickness of the color film layer.

The calculation circuit is connected to the separation circuit, and configured to receive the size parameters of the color film layers of the plurality of pixel regions in the display area obtained by the separation circuit, and calculate step differences between the color film layers of different colors.

The summary circuit is connected to the calculation circuit, and configured to calculate the volume of the uneven region of the color filter substrate in the display area based on the step differences between the color film layers of different colors.

In the calculation circuit, by taking, as a reference, a thickness of the color film layers of one color among the color film layers of different colors, the step difference of the color film layers of each of the other colors with respect to the color film layers of the one color is calculated. Generally, when manufacturing the color film layers of different colors, blue film layers are firstly manufactured, and therefore, the thickness of the blue film layers located at the bottom in the color filter substrate may serve as the reference, so that the process of calculating the step differences between film layers can be simplified.

It could be understood that a liquid crystal panel includes a display area for image display and a peripheral area surrounding the display area, and the peripheral area is configured to provide a wiring region the driving circuit, and the like. The display area of an array substrate substantially corresponds to the display area of a color filter substrate, and the position and size of the display area of the liquid crystal panel depend on the display areas of the array substrate and the color filter substrate that are aligned and assembled. A plurality of pixel regions arranged in an array are disposed in the display area of the liquid crystal panel, and each color film layer in the color filter substrate is disposed in the respective pixel region.

It should be noted that the processing circuit 3 according to the embodiment of the present disclosure may be implemented as a memory and a processor coupled to each other, the memory stores computer executable instructions, and when the computer executable instructions are executed by the processor, the processor is caused to implement the functions of the above-described separation circuit, calculation circuit, and summary circuit. Suitable examples of the memory include, but are not limited to, a magnetic disk or magnetic tape; an optical storage medium such as a compact disc (CD) or DVD (digital versatile disc); a flash memory; and other non-transitory medium. In an embodiment, the memory is a non-transitory memory. Needless to say, the processing circuit 3 according to the embodiment of the present invention is not limited thereto, and may be implemented in other form in which software and hardware are combined.

Figure 3:
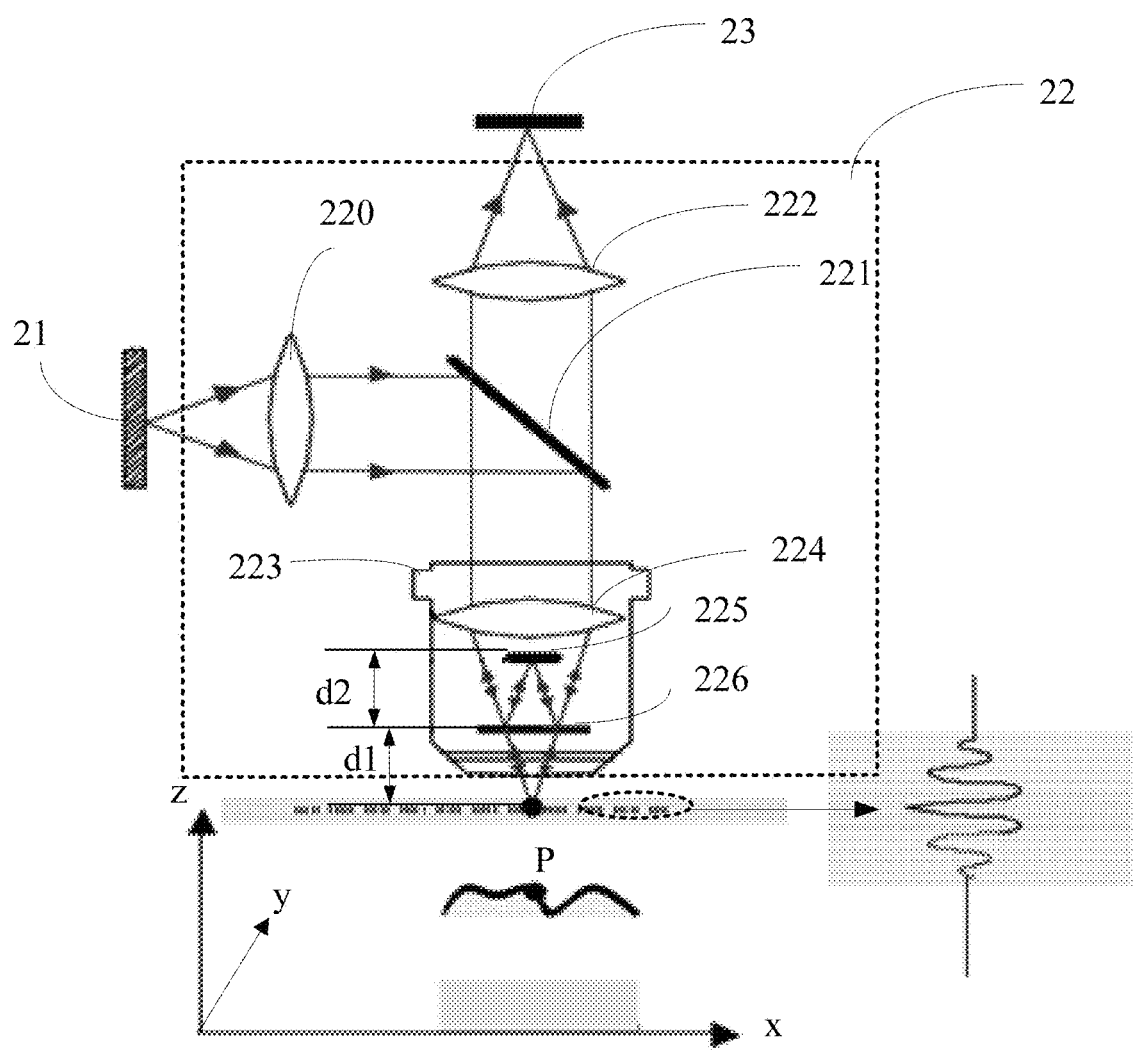
FIG. 3 is a schematic diagram showing a structure and measuring principle of the collection unit in FIG. 2.

As shown in FIG. 3, the collection unit 2 may include a light source unit 21, an optical path unit 22, and an acquisition unit 23. The light source unit 21 is configured to provide a measurement beam to the optical path unit 22. When a plurality of optical path units 22 are provided, the plurality of optical path units 22 may share the light source unit 21.

The optical path unit 22 is configured to receive the measurement beam, and split the measurement beam into a reference beam and an illumination beam, such that the reference beam interferes with a reflected beam generated after the illumination beam irradiates onto a surface of the color filter substrate to produce an interference image. In the optical path unit 22, by splitting the measurement beam, the illumination beam that irradiates onto the surface of the color filter substrate and the reference beam having the same frequency as the illumination beam are generated, thereby forming the interference image, and providing a surface image for automatically detecting the volume of the uneven region of the color filter substrate in the display area. For example, the optical path unit 22 can be packaged as an integrated device to ensure measurement accuracy of the volume of the uneven region of the color filter substrate in the display area.

The acquisition unit 23 is configured to receive the interference image generated by the optical path unit 22, and obtain a surface image of the color filter substrate in the display area based on the interference image. For example, the acquisition unit 23 may be a CCD camera.

The optical path unit according to an embodiment of the present disclosure may include a beam expander 220, a transflective mirror 221, an imaging lens 222, and an interference optical assembly 223, as shown in FIG. 3. The optical axes of the beam expander 220 and the imaging lens 222 are perpendicular to each other, and the imaging lens 222 and the interference optical assembly 223 are respectively disposed on both sides of the transflective mirror 221. The beam expander 220 is disposed between the light source unit 21 and the transflective mirror 221, and is configured to collimate and expand the light emitted from the light source unit 21 to generate a parallel beam, and to cause the parallel beam to be emitted to the transflective mirror 221. The transflective mirror 221 is configured to receive the parallel beam generated by the beam expander 220 and to reflect the parallel beam to the interference optical assembly 223.

The interference optical assembly 223 is disposed on one side of the transflective mirror 221 (e.g., below the transflective mirror 221, as shown in FIG. 3), and configured to receive the reflected parallel beam from the transflective mirror 221, and split the reflected parallel beam to a reference beam and an illumination beam, the illumination beam irradiates on the surface of the color filter substrate to generate a reflected beam, and because the reflected beam interferes with the reference beam, an interference image including surface information of the color filter substrate is generated.

The imaging lens 222 is disposed between the acquisition unit 23 and the transflective mirror 221 and is configured to image the interference image to the acquisition unit 23.

The interference optical assembly 223 in the embodiment of the present disclosure may include an objective lens 224, a reference mirror 225, and a beam splitter 226 disposed in parallel. The objective lens 224 receives the reflected parallel beam from the transflective mirror 221 and transmits the same to the beam splitter 226.

The reference mirror 225 is disposed between the objective lens 224 and the beam splitter 226, the distance between the beam splitter 226 and the reference mirror 225 is adjustable, and the beam splitter 226 transmits a part of the beam from the objective lens 224 to the surface of the color filter substrate, and reflects another part of the beam from the objective lens 224 to the reference mirror 225. The reference mirror 225 reflects all of the received light to the beam splitter 226 to generate the reference beam, which interferes with the reflected beam on the surface of the color filter substrate, and a parallel beam for imaging is generated through the objective lens 224. The reference mirror 225 may be a reflecting mirror, and the beam splitter 226 may be a transflective mirror.

As shown in FIG. 3, during the measuring process, the light emitted by the light source turns into a parallel beam through the beam expander 220, and then is reflected into the objective lens 224 through the transflective mirror 221. A part of the beam passing through the objective lens 224 is transmitted through the beam splitter 226 to reach the surface of the color filter substrate, and another part thereof is reflected to the reference mirror 225. When a wave is reflected, since the reflected wave and the incident wave propagate in a same medium, the frequency, wavelength and speed of the wave maintain unchanged, and therefore, the reference mirror 225 reflects all of the received beam to the beam splitter 226 to generate a reference beam, and the part of the beam transmitted to the surface of the color filter substrate is reflected back to the beam splitter 226, and the reflected beam interferes with the reference beam. According to the interference principle, in a case where two coherent beams having a same frequency, a constant phase difference, and a same vibrating direction interfere with each other, the interference intensity is maximum when $d1=d2$, where $d1$ is the distance between the beam splitter 226 and the surface of the color filter substrate, and $d2$ is the distance between the reference mirror 225 and the beam splitter 226. An image obtained based on different interference intensities can reflect the condition of the surface of the measured object, e.g., the condition of the surface of the color filter substrate.

The detecting device of the present disclosure performs measurement of the surface image using the principle of white light interference. The white light interference has the largest interference intensity, and the interference fringe has a width of about 3 μm to 4 μm, when the optical path difference is zero. Therefore, the light source unit 21 in the detecting device is a white light source capable of emitting white light such as a white LED. By adjusting the optical path difference to be approximately zero, a strong interference fringe can be obtained, and then the surface condition can be determined according to the obtained interference image, thereby obtaining a relatively accurate volume of the uneven region of the color filter substrate in the display area.

In an embodiment, a support disk (not shown in FIG. 3) may be disposed under the transflective mirror 221, and the interference optical assembly 223 is disposed on the support disk, and each interference optical assembly 223 is provided with a corresponding micro-scanner (not shown in FIG. 3). The micro-scanner can drive the whole interference optical assembly 223 or one of the beam splitter 226 and the reference mirror 225 in the interference optical assembly 223 to conduct position adjustment.

During the measurement, at first, the distance d2 between the reference mirror 225 and the beam splitter 226 may be kept unchanged, and the position of the interference optical assembly 223 in the vertical direction may be adjusted to focus to the measured object. Thereafter, the Z-axis (d1) is kept unchanged, and one of the beam splitter 226 and the reference mirror 225 in the interference optical assembly 223 is controlled by the micro-scanner to scan (i.e., conduct position adjustment in the Z direction) to find an appropriate d2. The surface of the measured object is composed of a plurality of points, one of the beam splitter 226 and the reference mirror 225 in the interference optical assembly 223 is controlled by the micro-scanner to scan, the plurality of points will enter the interference region, thus the size parameters (e.g., heights) of the plurality of points can be obtained, and a difference from the reference plane is the measured step difference. It can be easily understood that the distance d2 between the beam splitter 226 and the reference mirror 225 may be kept unchanged, a plurality of interference optical assemblies may be separately provided, and the distance d2 between the reference mirror 225 and the beam splitter 226 in each of the plurality of interference optical assemblies is different, so that measurements adapted to various surfaces can be achieved by the plurality of interference optical assemblies. In addition, since the reference mirror 225 is generally light in weight, the micro-scanner may be configured to drive the reference mirror 225 to conduct position adjustment for scanning.

Figure 4:
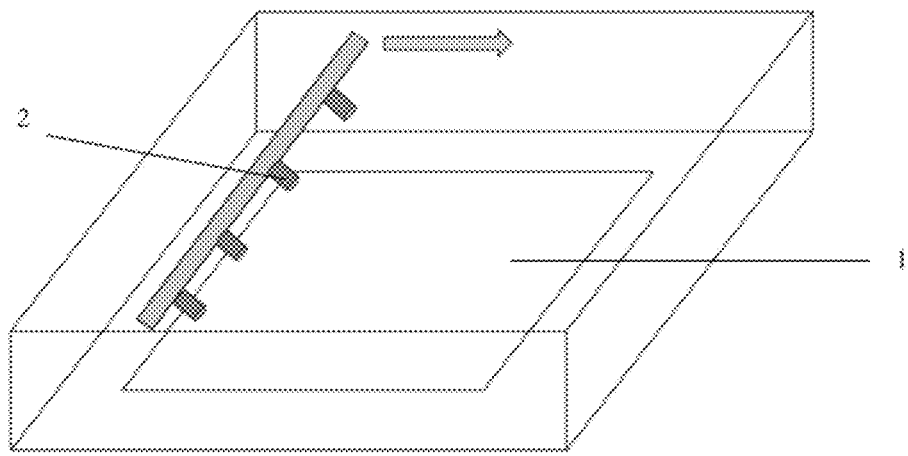
FIG. 4 is a schematic diagram showing installation of a collection unit in an embodiment of the present disclosure.

The detecting device of the embodiment of the present disclosure may include a plurality of collection units 2, each of which is connected to the processing circuit. The detecting device may further include a gantry configured to support the collection unit 2. As shown in FIG. 4, the gantry is disposed inside a chamber, and a plurality of collection units 2 (e.g., four collection units 2) are disposed on the gantry. In the case of the plurality of collection units 2, a controller for controlling the light source and a distributor may be disposed between the light source unit 21 and the optical path units 22, so that the optical path units 22 of the plurality of collection units 2 may share one light source unit 21, in other words, one light source unit 21 may provide a suitable measurement beam for each of the optical path units 22 of the plurality of collection units 2.

In order to precisely control the objective lens to reach the target position, a position sensor may be provided in the gantry for monitoring moving positions of the optical path unit 22 in the horizontal direction and the vertical direction. In addition, the detecting device may further include a control motor connected to the gantry and configured to drive the gantry to move so as to move the entire optical path unit 22 flexibly and conveniently, which may be set according to actual conditions in practical applications. In a practical detecting process, it is possible to keep the collection unit 2 fixed, and move the color filter substrate to obtain a surface image. Alternatively, it is possible to keep the color filter substrate fixed, and move the collection unit 2 to scan to obtain a surface image.

As shown in FIG. 4, one passing color filter substrate is continuously scanned by a plurality of collection units 2, and captured 3D surface image data are recorded. Then the surface image data is calculated and analyzed, and the volume of the uneven region, between the RGB film layers, on the surface of the color filter substrate is accurately calculated by taking the pixel region of the color filter substrate as the unit, thereby accurately calculating the amount of liquid crystal required in the cell-forming process. As a result, the liquid crystal margin will not shift, thereby preventing defects such as Gravity Mura or Bubble in the display product.

It should be understood that the detecting device of the embodiments of the present disclosure may take only some pixel regions on the color filter substrate that are uniformly distributed as measurement points, and may also measure all of the pixel regions one by one under the premise that the measurement time and the data processing amount are not limited, so as to obtain the actual space size of the display area of the color filter substrate.

With the detecting device, the purpose of automatically detecting the volume of the uneven region of the color filter substrate in the display area can be realized, and the appropriate filling amount of liquid crystal can be further estimated to ensure product quality.

Figure 5:
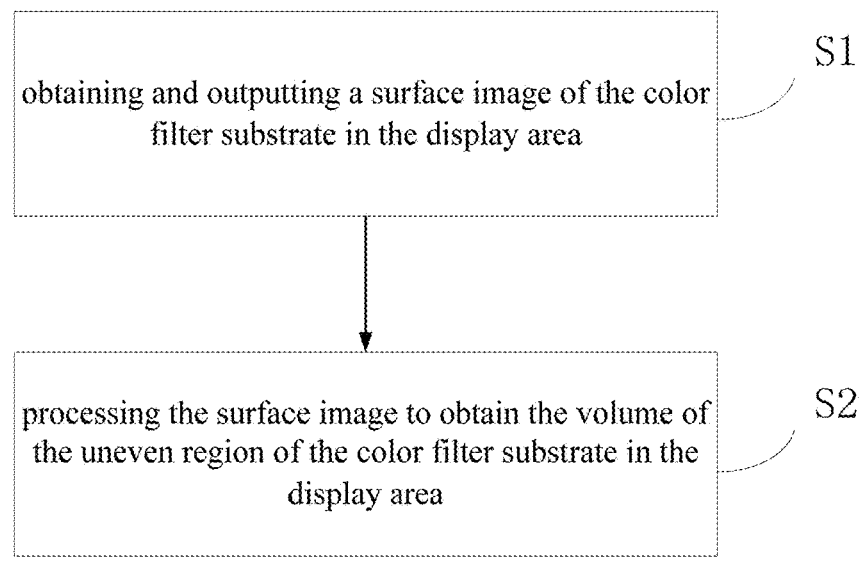
FIG. 5 is a flowchart of a detecting method in an embodiment of the present disclosure.

The embodiments further provide a detecting method for detecting a volume of an uneven region of a color filter substrate in the display area. As shown in FIG. 5, the detecting method includes:

step S1): obtaining and outputting a surface image of the color filter substrate in the display area; and step S2): processing the surface image to obtain the volume of the uneven region of the color filter substrate in the display area.

By using the detecting method, the purpose of automatically detecting the volume of the uneven region of the color filter substrate in the display area can be realized, and the appropriate filling amount of liquid crystal can be further estimated to ensure product quality.

Step S1) of obtaining and outputting a surface image of the color filter substrate in the display area may include steps S11) to S13).

Step S11) includes providing a measurement beam.

Step S12) includes: collimating and expanding the measurement beam to generate a parallel beam to be emitted out, and splitting the parallel measurement beam into a reference beam and an illumination beam such that that the reference beam interferes with a reflected beam generated after the illumination beam irradiates on a surface of the color filter substrate to produce an interference image. That is, the parallel beam is reflected to generate a reflected parallel beam; the reflected parallel beam is split into the reference beam and the illumination beam, and the illumination beam irradiates onto the surface of the color filter substrate to generate the reflected beam, which interferes with the reference beam to obtain the interference image including surface information of the color filter substrate.

Step S13) includes: obtaining the surface image of the color filter substrate in the display area based on the interference image.

Step S2) of obtaining a volume of an uneven region of the color filter substrate in the display area may include the following steps S21) to S23).

Step S21) includes: obtaining, from the surface image, size parameters of color film layers in a plurality of pixel regions, the size parameters of the color film layers including at least thicknesses of the color film layers.

Step S22) includes: receiving the size parameters of the color film layers in the plurality of pixel regions, and calculating step differences between the color film layers of different colors.

In this step, by taking, as a reference, a thickness of the color film layers of one color among the color film layers of different colors, the step difference of the color film layers of each of the other colors with respect to the color film layers of the one color is calculated. Generally, when manufacturing the color film layers of different colors, blue film layers are firstly manufactured, and therefore, the thickness of the blue film layers located at the bottom in the color filter substrate may serve as the reference, so that the process of detecting the step differences between film layers can be simplified.

Step S23) includes: calculating the volume of the uneven region of the color filter substrate in the display area according to the step differences between the color film layers of different colors.

In an embodiment, the above detecting method may be implemented by using the above detecting device, and the method may include:

step S1): obtaining and outputting a surface image of the color filter substrate in the display area by the collection unit; and step S2): processing the surface image by the processing circuit to obtain the volume of the uneven region of the color filter substrate in the display area.

Step S1) of obtaining and outputting a surface image of the color filter substrate in the display area by the collection unit may include:

step S11): providing a measurement beam by the light source unit;

step S12): by using the optical path unit, collimating and expanding the measurement beam to generate a parallel beam to be emitted out, and splitting the parallel measurement beam into a reference beam and an illumination beam such that that the reference beam interferes with a reflected beam generated after the illumination beam irradiates on a surface of the color filter substrate to produce an interference image; and step S13): obtaining, by the acquisition unit, the surface image of the color filter substrate in the display area based on the interference image.

Step S12) may include:

collimating and expanding, by the beam expander, the measurement beam to generate a parallel beam to be emitted out;

reflecting the parallel beam by the transflective mirror to generate a reflected parallel beam; and splitting the reflected parallel beam by the interference optical assembly into the reference beam and the illumination beam, wherein the illumination beam irradiates on the surface of the color filter substrate to generate the reflected beam, and the reflected beam interferes with the reference beam to produce the interference image containing surface information of the color filter substrate.

Step S2) of obtaining a volume of an uneven region of the color filter substrate in the display area by the processing circuit may include:

step S21) of obtaining, from the surface image, size parameters of color film layers of a plurality of pixel regions and sending the obtained size parameters of the color film layers to the calculation circuit, by the separation circuit, the size parameters of the color film layers including at least thicknesses of the color film layers;

step S22) of receiving the size parameters of the color film layers in the plurality of pixel regions and calculating step differences between the color film layers of different colors by the calculation circuit; and step S23) of calculating the volume of the uneven region of the color filter substrate in the display area based on the step differences between the color film layers of different colors by the summary circuit.

The operating principle of the detecting method is as follows.

Figure 6A:
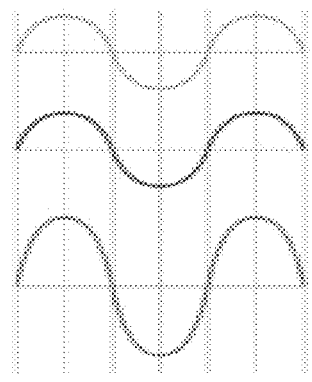
FIGS. 6A and 6B are schematic diagrams illustrating interference between two light waves.
Figure 6B:
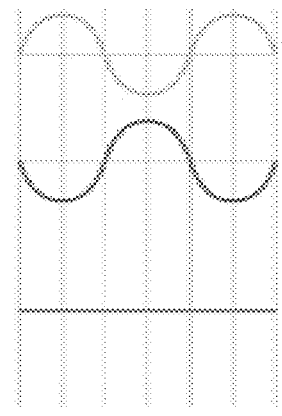

Referring to the optical path diagram shown in FIG. 3, the light emitted by the light source turns into a parallel beam through the beam expander 220, and the parallel beam then is reflected into the objective lens 224 through the transflective mirror 221. A part of the beam passing through the objective lens 224 is transmitted through the beam splitter 226 to the surface of the color filter substrate, and another part thereof is reflected to the reference mirror 225. The reference mirror 225 reflects all of the received beam to the beam splitter to generate the reference beam, and the part of the beam transmitted to the surface of the color filter substrate is reflected back to the beam splitter 226, and the reflected beam and the reference beam have a same frequency and thus interferes with each other (P is an interference wave intensity in FIG. 3). According to the interference principle, when two light waves meet, bright-dark alternating fringes are generated when the optical path difference is an integer multiple of ½ wavelength, and the interference intensity is maximum when d1=d2. Constructive interference occurs when the optical path difference is an even multiple of ½ wavelength, as shown in FIG. 6A, and the superposition is enhanced; destructive interference occurs when the optical path difference is an odd multiple of ½ wavelength, as shown in FIG. 6B, and the superposition is weakened.

Figure 7:
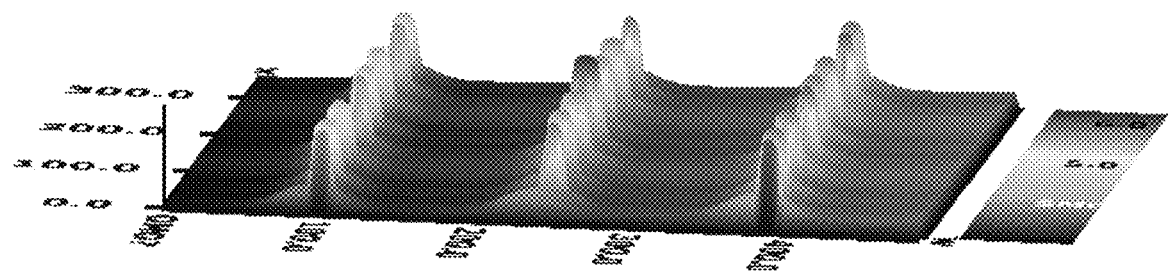
FIG. 7 is a schematic diagram of a surface image of a color filter substrate taken by a collection unit according to an embodiment of the present disclosure.

FIG. 7 shows a 3D surface image of a surface of a color filter substrate taken by the collection unit, in the case that the entire color filter substrate takes the color film layer located at the bottom, for example, the blue film layer, as the reference, the step difference of each of the green film layer and the red film layer from the blue film layer may be separately measured in one pixel region, and the size of each pixel region has been designed, so that values of the length and width can be known. Therefore, by using the measured step difference as the height, the volume of the uneven region can be calculated by using the length, the width, and the height, so that the amount of liquid crystal required for the uneven regions of the entire color filter substrate can be accurately calculated.

Figure 8:
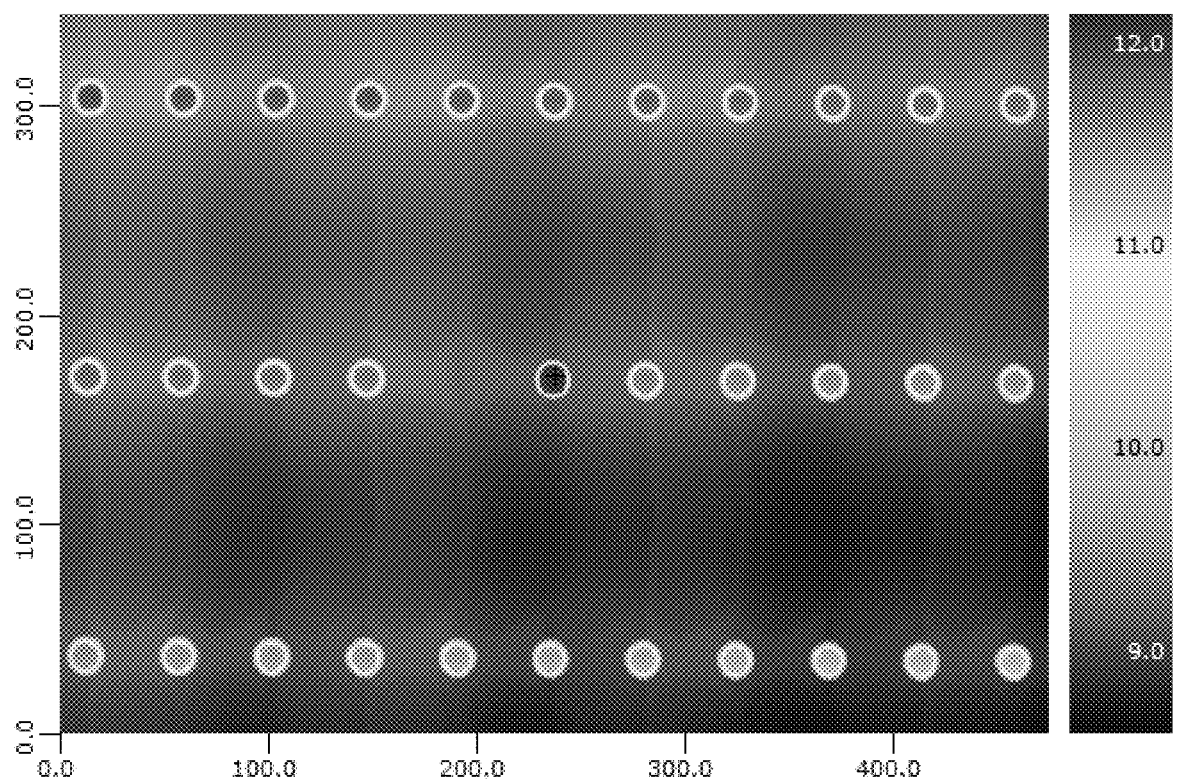
FIG. 8 is a top view of a surface image of a color filter substrate taken by a collection unit according to an embodiment of the present disclosure.
Figure 9:
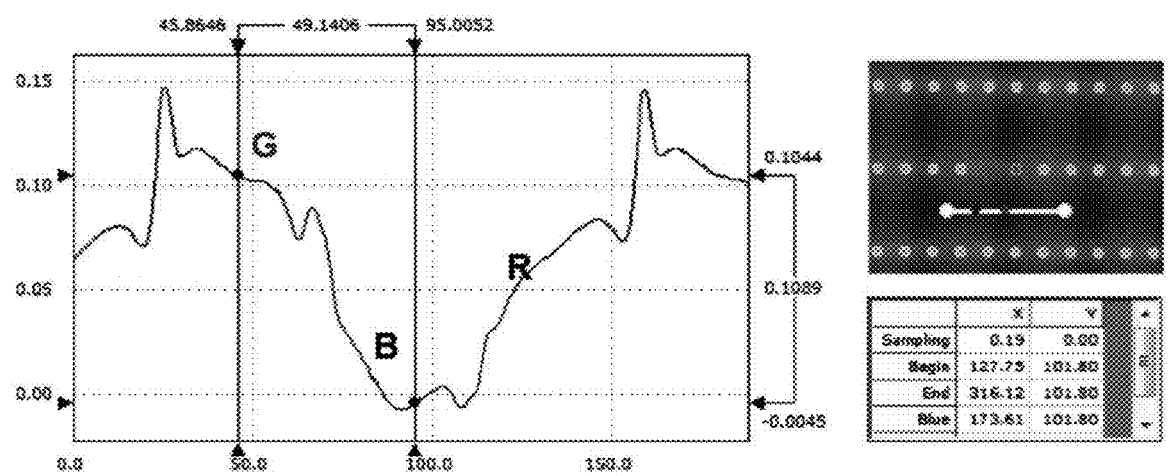
FIG. 9 is a schematic diagram showing a processing result of the image in FIG. 8.

FIG. 8 is a top view of the surface of the color filter substrate of an 8WXGA product taken by the collection unit, and the result shown in FIG. 9 can be obtained by processing the surface image in FIG. 8. According to FIG. 9, it can be seen that there is a step difference of 0.11 μm between the green film layers and the blue film layers, and the pixel region of 8WXGA has a size of 134.55*44.85, thereby calculating the volume of the uneven region caused by the step difference between the green film layer and the blue film layer by using the length, the width and the height. Similarly, the volume of the uneven region caused by the step difference between the red film layer and the blue film layer can be calculated, and the total volume of the uneven regions caused by the step differences between respective surfaces of the color film layers of different colors in the color filter substrate can be obtained. When calculating the amount of liquid crystal, by taking the precise amount of liquid crystal required for this uneven part into consideration, the precise amount of liquid crystal required for a liquid crystal display product can be obtained, thereby improving the product quality.

It could be seen that the detecting device and the corresponding detecting method can automatically detect the volume of the uneven region of the color filter substrate in the display area, thereby obtaining an appropriate filling amount of liquid crystal, avoiding liquid crystal-related defects, and ensuring product quality.

The embodiments also provide a liquid crystal dropping apparatus, including a liquid crystal dropping device and a detecting device provided by the embodiments of the present disclosure. The liquid crystal dropping device fills with a liquid crystal according to the volume of the uneven region of the color filter substrate in the display area obtained by the detecting device.

Correspondingly, the present embodiments further provide a liquid crystal dropping method, which includes filling with a liquid crystal according the volume of the uneven region of the color filter substrate in the display area obtained by the detecting method provided by the embodiments of the present disclosure.

With the liquid crystal dropping apparatus and the liquid crystal dropping method, an appropriate filling amount of the liquid crystal can be automatically detected to ensure product quality.

It could be understood that the above implementations are merely exemplary implementations employed for explaining the principles of the present disclosure, but the present disclosure is not limited thereto. Various modifications and improvements can be made by those skilled in the art without departing from the spirit and scope of the disclosure, and these modifications and improvements are also considered as falling within the protection scope of the present disclosure.

What is claimed is:

1. A detecting device, configured to detect a volume of an uneven region of a color filter substrate in a display area, and comprising at least one collection unit and a processing circuit, wherein:
    the collection unit is configured to obtain a surface image of the color filter substrate in the display area, and output the obtained surface image to the processing circuit; and
    the processing circuit is connected to the collection unit and configured to process the surface image to obtain the volume of the uneven region of the color filter substrate in the display area, wherein the processing circuit comprises a separation circuit, a calculation circuit, and a summary circuit, wherein:
    the separation circuit is configured to obtain, from the surface image, size parameters of color film layers in a plurality of pixel regions;
    the calculation circuit is connected to the separation circuit and configured to receive the size parameters of the color film layers in the plurality of pixel regions obtained by the separation circuit, and calculate step differences between the color film layers of different colors; and
    the summary circuit is connected to the calculation circuit and configured to calculate the volume of the uneven region of the color filter substrate in the display area based on the step differences between the color film layers of different colors.

2. The detecting device of claim 1, wherein the calculation circuit is further configured to calculate, by taking, as a reference, a thickness of the color film layers of one color among the color film layers of different colors, the step difference of the color film layers of each of the other colors with respect to the color film layers of the one color.

3. The detecting device of claim 1, wherein the collection unit comprises a light source unit, an optical path unit and an acquisition unit, wherein:
    the light source unit is configured to provide a measurement beam to the optical path unit;
    the optical path unit is configured to receive the measurement beam and split the measurement beam into a reference beam and an illumination beam such that the reference beam interferes with a reflected beam of the illumination beam irradiating on a surface of the color filter substrate to generate an interference image; and
    the acquisition unit is configured to receive the interference image generated by the optical path unit, and obtain the surface image of the color filter substrate in the display area based on the interference image.

4. The detecting device of claim 3, wherein the optical path unit comprises a beam expander, a transflective mirror, an imaging lens, and an interference optical assembly, optical axes of the beam expander and the imaging lens are perpendicular to each other, the imaging lens and the interference optical assembly are on two sides of the transflective mirror, respectively, wherein:
    the beam expander is between the light source unit and the transflective mirror and configured to collimate and expand light emitted from the light source unit to generate a parallel beam and cause the generated parallel beam to be emitted toward the transflective mirror;
    the transflective mirror is configured to receive the parallel beam from the beam expander and reflect the parallel beam to the interference optical assembly;
    the interference optical assembly is configured to receive the reflected parallel beam from the transflective mirror and split the reflected parallel beam into the reference beam and the illumination beam, the illumination beam irradiates onto the surface of the color filter substrate to generate the reflected beam, and the reflected beam interferes with the reference beam to produce the interference image containing surface information of the color filter substrate; and
    the imaging lens is between the acquisition unit and the transflective mirror and configured to image the interference image to the acquisition unit.

5. The detecting device of claim 4, wherein the interference optical assembly comprises an objective lens, a beam splitter, and a reference mirror parallel to one another, wherein:
    the objective lens is configured to receive the reflected parallel beam from the transflective mirror and transmit the same to the beam splitter;
    the beam splitter is configured to transmit a part of the beam from the objective lens to the surface of the color filter substrate, and reflect a part of the beam from the objective lens to the reference mirror; and
    the reference mirror is between the objective lens and the beam splitter, and a distance between the beam splitter and the reference mirror is adjustable, the reference mirror is configured to reflect all received beam to the beam splitter to generate the reference beam, wherein the reference beam is capable of interfering with the reflected beam generated on the surface of the color filter substrate to generate an imaging parallel beam through the objective lens.

6. The detecting device of claim 1, wherein the detecting device comprises a plurality of collection units, and the plurality of collection units are each connected to the processing circuit.

7. The detecting device of claim 6, wherein the optical path units of the plurality of collection units share one light source unit.

8. The detecting device of claim 7, wherein the detecting device further comprises a gantry configured to support the collection units, the plurality of collection units being disposed on the gantry.

9. The detecting device of claim 3, wherein the light source unit is a white light source configured to provide white light, as the measurement beam, to the optical path unit.

10. The detecting device of claim 3, wherein the acquisition unit is a CCD camera.

11. A detecting method for detecting a volume of an uneven region of a color filter substrate in a display area, wherein the method comprises steps of:
  obtaining and outputting a surface image of the color filter substrate in the display area; and
  processing the surface image to obtain the volume of the uneven region of the color filter substrate in the display area,
  wherein the step of processing the surface image to obtain the volume of the uneven region of the color filter substrate in the display area comprises:
  obtaining, from the surface image, size parameters of color film layers in a plurality of pixel regions;
  receiving the size parameters of the color film layers in the plurality of pixel regions, and calculating step differences between the color film layers of different colors; and
  calculating the volume of the uneven region of the color filter substrate in the display area based on the step differences between the color film layers of different colors.

12. The detecting method of claim 11, wherein the step of obtaining and outputting a surface image of the color filter substrate in the display area comprises:
  providing a measurement beam;
  splitting the measurement beam into a reference beam and an illuminating beam such that the reference beam interferes with a reflected beam generated by the illuminating beam irradiating on a surface of the color filter substrate to produce an interference image; and
  obtaining the surface image of the color filter substrate in the display area based on the interference image.

13. The detecting method of claim 11, wherein when calculating step differences between the color film layers of different colors, by taking, as a reference, a thickness of the color film layers of one color among the color film layers of different colors, the step difference of the color film layers of each of the other colors with respect to the color film layers of the one color is calculated.

14. The detecting method of claim 11, wherein the detecting method is implemented by using a detecting device configured to detect a volume of an uneven region of a color filter substrate in a display area and comprising at least one collection unit and a processing circuit, wherein:
  the collection unit is configured to obtain a surface image of the color filter substrate in the display area, and output the obtained surface image to the processing circuit; and
  the processing circuit is connected to the collection unit and configured to process the surface image to obtain the volume of the uneven region of the color filter substrate in the display area,
  and the method comprises:
  obtaining the surface image of the color filter substrate in the display area and outputting the obtained surface image to the processing circuit by the collection unit; and
  processing, by the processing circuit, the surface image to obtain the volume of the uneven region of the color filter substrate in the display area.

15. The detecting method of claim 14, wherein the collection unit comprises a light source unit, an optical path unit and an acquisition unit, wherein:
  the light source unit is configured to provide a measurement beam to the optical path unit;
  the optical path unit is configured to receive the measurement beam and split the measurement beam into a reference beam and an illumination beam such that the reference beam interferes with a reflected beam of the illumination beam irradiating on a surface of the color filter substrate to generate an interference image; and
  the acquisition unit is configured to receive the interference image generated by the optical path unit, and obtain the surface image of the color filter substrate in the display area based on the interference image,
  and the step of obtaining the surface image of the color filter substrate in the display area and outputting the obtained surface image to the processing circuit by the collection unit comprises:
  providing, by the light source unit, a measurement beam;
  splitting, by the optical path unit, the measurement beam into a reference beam and an illuminating beam such that the reference beam interferes with the reflected beam generated by the illuminating beam irradiating on the surface of the color filter substrate to produce an interference image; and
  obtaining, by the acquisition unit, the surface image of the color filter substrate in the display area based on the interference image.

16. The detecting method of claim 15, wherein the optical path unit comprises a beam expander, a transflective mirror, an imaging lens, and an interference optical assembly, optical axes of the beam expander and the imaging lens are perpendicular to each other, the imaging lens and the interference optical assembly are on two sides of the transflective mirror, respectively, wherein:
  the beam expander is between the light source unit and the transflective mirror and configured to collimate and expand light emitted from the light source unit to generate a parallel beam and cause the generated parallel beam to be emitted toward the transflective mirror;
  the transflective mirror is configured to receive the parallel beam from the beam expander and reflect the parallel beam to the interference optical assembly;
  the interference optical assembly is configured to receive the reflected parallel beam from the transflective mirror and split the reflected parallel beam into the reference beam and the illumination beam, the illumination beam irradiates onto the surface of the color filter substrate to generate the reflected beam, and the reflected beam interferes with the reference beam to produce the interference image containing surface information of the color filter substrate; and
  the imaging lens is between the acquisition unit and the transflective mirror and configured to image the interference image to the acquisition unit, and the step of obtaining the surface image of the color filter substrate in the display area and outputting the obtained surface image to the processing circuit by the collection unit comprises:

collimating and expanding, by the beam expander, the measurement beam to generate a parallel beam to be emitted towards the transflective mirror;

reflecting, by the transflective mirror, the parallel beam to generate a reflected parallel beam;

splitting, by the interference optical assembly, the reflected parallel beam into the reference beam and the illumination beam, wherein the illumination beam irradiates on the surface of the color filter substrate to generate the reflected beam, the reflected beam interferes with the reference beam to generate the interference image containing surface information of the color filter substrate; and obtaining, by the acquisition unit, the surface image of the color filter substrate in the display area based on the interference image.

17. A liquid crystal dropping apparatus, comprising a liquid crystal dropping device and the detecting device of claim 1, wherein the liquid crystal dropping device fills with a liquid crystal according to the volume of the uneven region of the color filter substrate in the display area obtained by the detecting device.

18. A liquid crystal dropping method, comprising the detecting method of claim 11, wherein the liquid crystal dropping method further comprises filling with a liquid crystal according to the volume of the uneven region of the color filter substrate in the display area obtained by the detecting method.

* * * * *